(12) United States Patent
Gorinevsky

(10) Patent No.: US 6,647,354 B1
(45) Date of Patent: Nov. 11, 2003

(54) ITERATIVE LEARNING UPDATE FOR BATCH MODE PROCESSING

(75) Inventor: Dimitry M. Gorinevsky, Palo Alto, CA (US)

(73) Assignee: Honeywell Inc., Morristown, NJ (US)

( * ) Notice: Subject to any disclaimer, the term of this patent is extended or adjusted under 35 U.S.C. 154(b) by 362 days.

(21) Appl. No.: 09/667,977

(22) Filed: Sep. 22, 2000

(51) Int. Cl.$^7$ .................................................. G06G 7/48
(52) U.S. Cl. ........................ 702/179; 702/113; 702/127; 702/180; 702/187
(58) Field of Search ............................... 702/85, 86, 89, 702/90, 99, 106, 113, 116, 119, 120, 123, 125, 127, 130, 132, 179–183, 186, 187, 189, 190, 194, 197, FOR 104, FOR 108, FOR 114, FOR 117, FOR 135–137, FOR 139, FOR 154–160, FOR 162–165, FOR 170–171; 703/2, 12, 6; 700/28, 31, 38, 29, 30

(56) References Cited

U.S. PATENT DOCUMENTS

| | | | |
|---|---|---|---|
| 4,489,375 A | * 12/1984 | Putman ........................ 700/37 |
| 5,038,269 A | * 8/1991 | Grimble et al. ............... 700/52 |
| 5,060,132 A | * 10/1991 | Beller et al. .................. 700/38 |
| 5,402,333 A | * 3/1995 | Cardner ....................... 700/31 |
| 5,442,562 A | * 8/1995 | Hopkins et al. ............. 700/108 |
| 5,536,918 A | 7/1996 | Ohkase et al. | |
| 5,864,483 A | * 1/1999 | Brichta ....................... 700/109 |
| 5,875,416 A | * 2/1999 | Kanno ........................ 702/130 |
| 6,056,781 A | * 5/2000 | Wassick et al. ............... 703/12 |
| 6,106,785 A | 8/2000 | Havlena et al. | |
| 6,110,289 A | 8/2000 | Moore | |
| 2002/0124205 A1 | * 9/2002 | Grey et al. .................... 714/33 |

FOREIGN PATENT DOCUMENTS

WO    0027228 A    5/2000

OTHER PUBLICATIONS

Dimtry Gorinevsky, "Distributed System Loopshaping Design of Iterative Control for Batch Processes", *IEEE Conference on Decision and Control*, Phoenix, Arizona, Dec. 1999, 6 pages.

K. Mike Tao et al., "Learning Feedforward Control", *Proceedings of the American Control Conference*, FA8–10:10, Baltimore, Maryland, Jun. 1994, pp. 2575–2579.

Suguru Arimoto, "Learning Control Theory for Robotic Motion", *International Journal of Adaptive Control and Signal Processing*, Vol 4., 1990, pp. 544–563.

Young Man Cho et al., "Control of Rapid Thermal Processing: A System Theoretic Approach", *IEEE Transactions on Control Systems Technology*, vol. 5, No. 6, Nov. 1997, pp. 644–653.

(List continued on next page.)

*Primary Examiner*—Marc S. Hoff
*Assistant Examiner*—Carol S Tsai
(74) *Attorney, Agent, or Firm*—Crompton, Seager & Tufte

(57) ABSTRACT

Process control methods and apparatus for controlling batch processes including batch heating processes. The present invention includes iterative learning control (ILC) techniques to provide improved run-to-run process control. One method provides a desired temperature profile over the length of a batch time period. This method gathers historical measured value data over the length of a first batch run which can be converted to deviation or error historical data, as well as a historical output history of outputs provided to control the process for the first run. The historical deviation and output histories from the first run can then be used to generate the output profile for a second batch run. Thus, the outputs from a first batch, such as the output to a local heater control, together with the deviation or error history from the first batch run, can be added to the output value provided during the previous batch to generate new output value to be used to control a second batch run.

9 Claims, 10 Drawing Sheets

OTHER PUBLICATIONS

Tadashi Ishihara et al., "A Discrete–Time Design of Robust Iterative Learning Controllers", *IEEE Transactions on Systems, Man and Cybernetics*, vol. 22, No. 1, Jan./Feb. 1992, pp.

Tao, K.M. et al., "Feedforward learning applied to RTP of semiconductor wafers", *33rd IEEE Conference on Decision and Control*, Dec. 1994, pp. 67–72.

Ebert, J. L. et al., "Thermal modeling and control of rapid thermal processing systems", *34th IEEE Conference on Decision and Control*, New Orleans, LA, Dec. 1995, pp. 1304–1309.

D.Gorinevsky: "Distributed System Loop Shaping Design of Iterative Control of Batch Processes", Proceedings of the *38th Conference on Decision and Control*, vol. 1, Dec. 1999 pp. 245–250, XP002197216 USA, Cited in the Application p. 245, Left–Hand Column, Line 1—p. 248, Left–Hand Column, Line 9.

\* cited by examiner

ITERATIVE LEARNING UPDATE FOR BATCH MODE PROCESSING

FIELD OF THE INVENTION

The present invention is related generally to process control methods, and more particularly to methods for iterative learning control of batch mode processes.

BACKGROUND OF THE INVENTION

In order to achieve maximum economic efficiency and optimum product quality, the demands for more comprehensive process control automation have continued to increase in both quantity and sophistication. In this regard, substantial advances have been made in terms of the ability to rapidly acquire input data from a multitude of sensors and generate highly reliable output commands for controlling a physical process.

However, most process control methodologies have traditionally relied on the use of feedback signals to steer one or more proportional-integral-derivative ("PID") algorithms, as a way to achieve a desired set-point. While this approach to process control has been unquestionably effective, it is primarily reactive in nature. Accordingly, the use of feedback-based control may lead to a sluggish overall system response and/or cause an adjustment to be made that would be larger than would otherwise be desirable.

Batch mode processing is one example of a process control challenge where feedback-based control may not consistently achieve an optimum result. Batch mode processes are processes that have sequentially executed batch runs, each substantially identical, and each producing an end material or result. Batch mode control will typically involve moving set-points, process delays, large inertia, non-linearities, unmeasured disturbances and/or multiple control efforts. Accordingly, information from the sensors as to the current state of the batch process is important in terms of achieving the existing set-point, but this information may not be sufficient, by itself, to achieve a subsequent set-point without encountering an unwanted delay in the change of a process parameter, such as temperature or pressure.

While a dynamic lag in a process parameter may be overcome by bringing about a significant change in a manipulated parameter (e.g., a heating element), it is generally considered less desirable to force large changes on a process control system. Additionally, one of the key goals of any batch control process is the ability to minimize product variability from one batch to another. Accordingly, a continuing need exists to develop process control methodologies that are capable of minimizing product variability in batch processes, as well as other varying process control applications.

SUMMARY OF THE INVENTION

The present invention includes methods and apparatus for controlling batch mode processes to improve control the of the batch processes, and in particular, from one batch run to the next. The deviation or errors from a first batch run, together with the outputs provided to control the first batch run, are used to generate an output value to be used to control a second batch run. In one method, each batch run is divided into a plurality of time slots.

For a first batch run, the deviation value of measured versus desired process values may be stored historically over the course of the first batch run. Similarly, the output values used to control the process may also be stored over the course of the first batch run. One method utilizes a data structure such as an array or file having one or more values stored for each time slot in the data structure. In a second batch run, for each time slot or time into the second batch run, data from the first run deviation history and output history are used together with weighting factors to generate an update or increment that can be added to the output value used during the first batch run for the same time slot in the second batch run. Similarly, the second batch run deviations and outputs may be used to generate the third batch run outputs. Preferably, the outputs described above are used in a supervisory control manner, providing supervisory control set points to a local (PID) controller that ultimately provides the control inputs for controlling the batch process.

In one embodiment of the invention, for a given time slot in a batch run, a subset of deviation values at a corresponding time in the immediately preceding batch are selected, as are a subset of output values disposed about the corresponding time in that preceding batch. The selected subset of deviation values may lie in a sliding window disposed about the selected time, which are each appropriately weighted by a deviation weighting factor and summed together to form an overall deviation contribution. The deviation weighting factors are termed the decoupling convolution window. Similarly, the selected subset of output values from the immediately preceding batch may each be appropriately weighted by output weighting factors which are summed to form an overall output contribution. The output weighting factors are termed the smoothing or output convolution window.

A set of weighting factors may be provided for each time slot within the deviation window, as well as a set of appropriate weighting factors for each time slot within the output window. The width and values for the decoupling and smoothing convolution windows may be determined by calculations based on a process model, or more preferably, on the process response to a series of step or pulse inputs. The overall deviation contribution and the overall output contribution for each given time slot can be combined to form an increment or update that can be added to the output value that was used during the first batch run at the corresponding time slot to provide a new output for the current time slot in the second batch run.

The output to the second batch thus includes contributions from the previous batch error or deviation, and the previous batch outputs to control the process. The previous batch deviation includes contributions from the immediately preceding batch, while the previous batch output values include inherent contributions from batches immediately proceeding, as well as earlier batches. The present invention provides a computationally simple method for providing an iterative update from batch to batch to achieve tighter batch-to-batch control.

DETAILED DESCRIPTION OF THE INVENTION

Figure 1A:
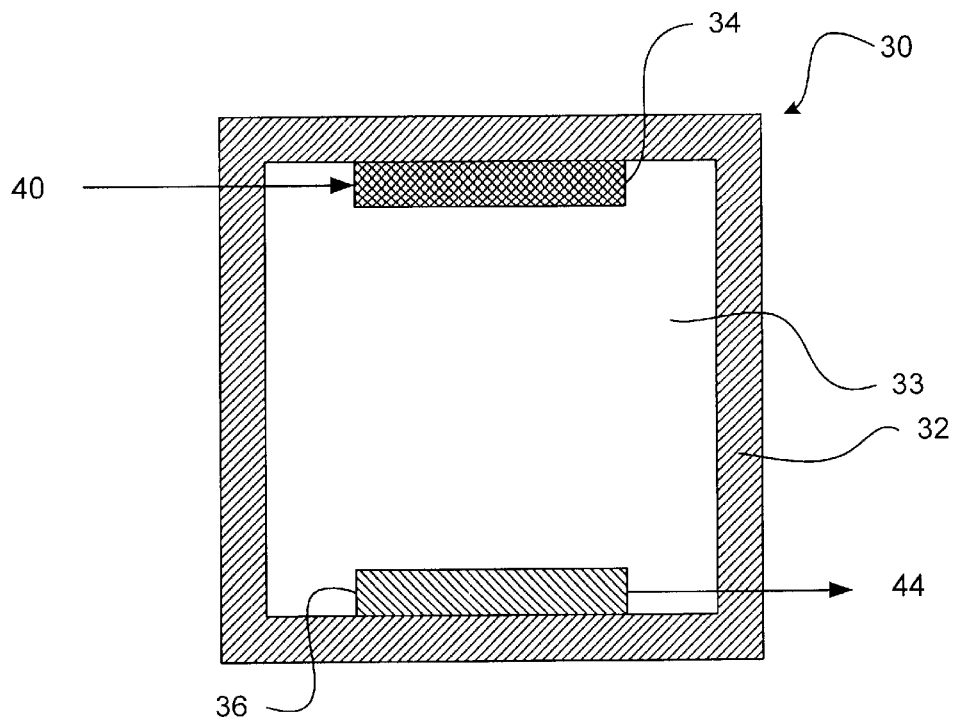
FIG. 1A is a schematic view of a batch process including a furnace, a heater control input, a heater, a heated part, and a measured temperature output.

FIG. 1A illustrates a batch process 30 including an enclosure or oven 32 having an interior 33 with heater 34 heating a heated part 36 within. In the example illustrated, a controller interior 33 with heater 34 heating a heated part 36 within. In the example illustrated, a controller output 40 is used to control heater 34. A measured or actual temperature value may be read out by a measured temperature signal as indicate at 44. In one use of the invention, for rapid thermal processing, heater 34 may include infrared heaters and heated part 36 may have the actual or measured temperature sensed directly by closely disposed thermocouples or other measurement devices. In some embodiments, measured temperature 44 may be the ambient temperature of chamber 32, rather than a direct measurement of heated part 36. In another embodiment, measured temperature 44 is measured using infrared techniques, with no direct contact required.

Process 30 may include any batch process for which run to run repeatability is desired. Batch rapid thermal processing, used in semiconductor manufacturing, is one application for the present invention. Batch process 30 may also be, for example, an annealing process or carbonization of parts in a high temperature furnace.

Figure 1B:
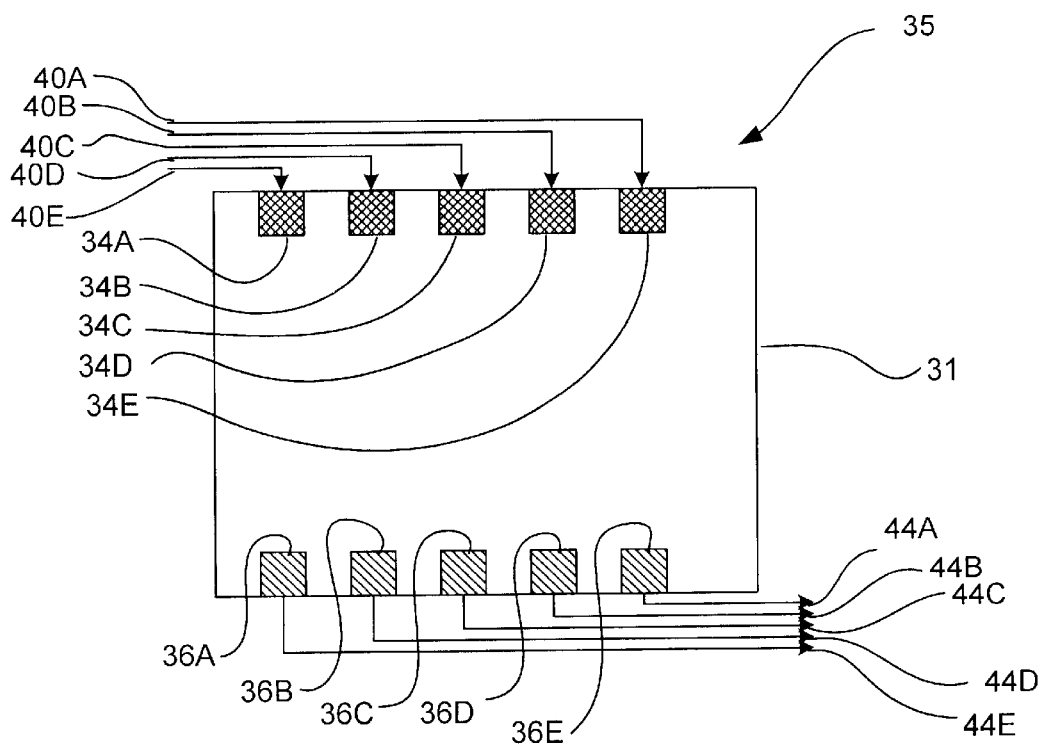
FIG. 1B is a schematic view of a batch process including a furnace, multiple heater control inputs, multiple heaters, multiple heated parts, and multiple measured temperature outputs.

FIG. 1B illustrates a batch process 35 including a furnace 31 having multiple heater control inputs 40A–40E, multiple heaters 34A–34E, multiple heated parts 36A–36E, and multiple measured temperature outputs 44A–44E. FIG. 1B illustrates one aspect of the difficulty of controlling a batch process having multiple inputs, even for the same controlled property. In particular, heaters 34A and 34E may have edge effects not experienced by heaters 34A and 34B. Heaters 34B through 34D may have significant decoupling problems due in part to the overlapping heating provided by adjacent heaters in adjacent zones.

Figure 2A:
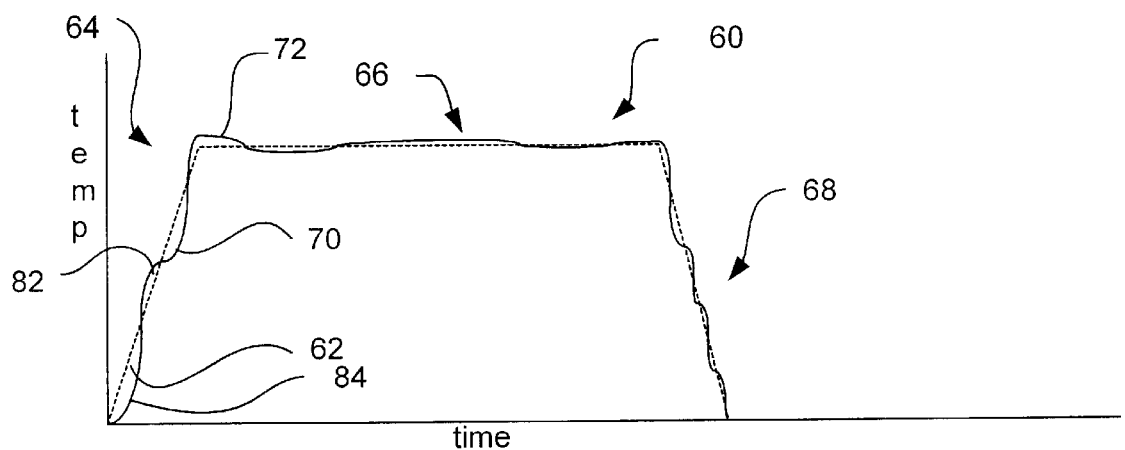
FIG. 2A is a plot of temperature versus time including a desired temperature profile and a measured temperature history for a batch.
Figure 2B:
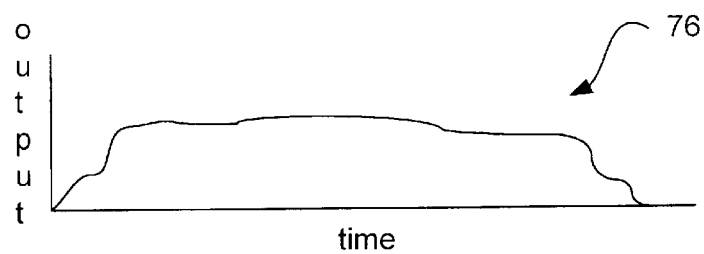
FIG. 2B is a highly diagrammatic plot of time versus temperature for the control outputs provided to the heater control used to achieve the measured temperature history of FIG. 2A.

FIG. 2A illustrates a plot 60 of process value versus time, which in this example is temperature versus time for a batch heating process. Plot 60 includes a desired or set point profile 62, including generally a ramp-up phase 64, a steady state phase 66, and a ramp-down phase 68. Also illustrated is a measured or actual temperature profile 70, shown following, or attempting to follow, desired temperature profile 62. As may be seen from inspection of FIG. 2A, for example at 72, 82, and 84, errors or deviations of actual versus desired temperature are present. The deviation or error may include both positive regions at indicated at 82, and negative regions as indicated at 84. Plot 60 may be seen to have a time period or length associated with plot 60. FIG. 2B illustrates a plot 76 of voltage or current versus time for controller output 40 of FIG. 1 corresponding to a batch process such as illustrated by plot 60 in FIG. 2A. Plot 76 is highly diagrammatic is not intended to illustrate the output of any particular control algorithm.

Figure 3A:
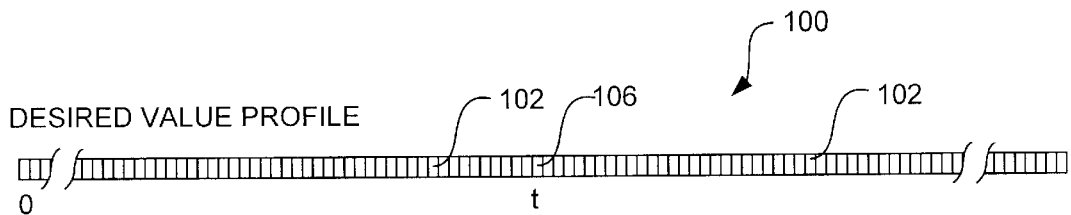
FIG. 3A is a schematic view of a desired temperature profile storage extending over the length of a batch such as illustrated in FIG. 2A, with the desired temperature profile including numerous time slots having desired temperatures stored within.

FIG. 3A illustrates storage of a desired temperature profile 100 corresponding to desired temperature profile 62 of FIG. 2A. In the example illustrated, desired temperature profile 100 includes numerous time slots or elements 102 which may each store a desired temperature or set point within. In one embodiment, desired temperature profile 100 may include an array having numerous elements, each containing a desired temperature value and, optionally, a time value. In one embodiment of the invention, the time value of each time slot is inferred by position and the time slots may be divided or spaced apart by equal time increments. Desired temperature profile 100 and time slots 102 may be stored as individual temperatures or may be generated as needed from models or equations within a controller or computer. Desired temperature profile 100 may be seen to have a current time slot 106 disposed at time "t". In one embodiment of the invention, the current desired temperature 106 is used to generate deviations and controller outputs.

Figure 3B:
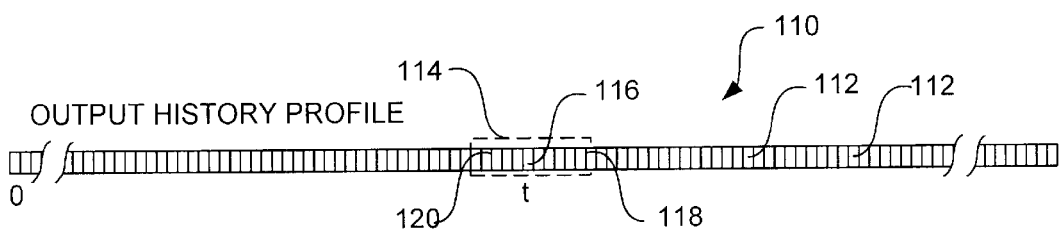
FIG. 3B is a schematic view of an output history to control a heater such as illustrated in FIG. 2B, having numerous time slots and a sliding time window disposed about the current time slot t.

FIG. 3B illustrates an output history 110 including numerous output time slots 112 and a sliding output history window 114 including a current time slot 116 disposed near the center of sliding window 114 as indicated by "t", as well as numerous time slots 118 disposed subsequent in time relative to current time slot 116, and time slots 120 disposed earlier in time relative to current time slot 116. In a preferred embodiment of the invention, the subset of time slots within sliding window 114 are used together with a smoothing convolution window to calculate control outputs for a subsequent batch.

Figure 3C:
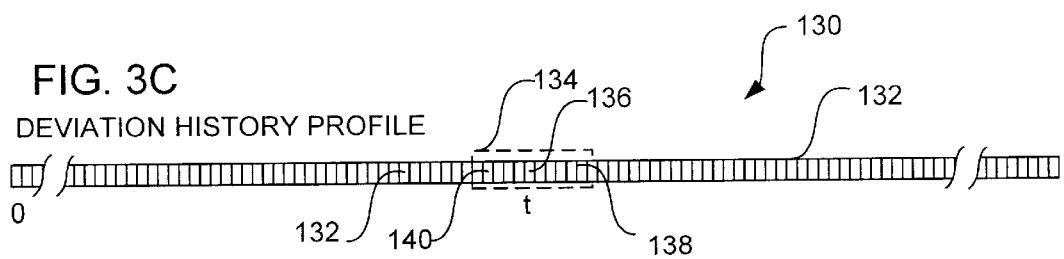
FIG. 3C is a schematic view of a deviation history formed of numerous time slots, each having an indication of deviation or error between measured and desired temperature, such as illustrated in FIG. 2A, and a sliding time window disposed about the current time slot t.

FIG. 3C illustrates a deviation history 130 formed of numerous deviation history time slots 132, and a deviation history sliding window 134 including a current time slot 136 which can correspond to the current time slot 106 of FIG. 3A. As may be seen from inspection of FIG. 3C, numerous deviation history time slots 138 are disposed at times subsequent to central time slot 136, numerous time slots 140 having time values earlier than central time slot 136 are disposed within sliding window 134 as well. In a preferred embodiment of the invention, the subset of deviation history represented within sliding window 134 is used together with a decoupling convolution window to provide an increment or update, which is then added to the previous output signal 116 to provide the control output at time "t" for a subsequent batch.

FIGS. 3A, 3B, and 3C represent historical data for a batch that has already been run. In a preferred embodiment of the invention, FIG. 3A represents a desired temperature profile which remains unchanged from batch to batch, or, from run to run. In a preferred embodiment, only current time slot 106 is used to generate a single output. In a preferred embodiment of the invention, FIGS. 3B and 3C represent historical data which are recorded for one batch, and are likely to change from one batch to the next. FIGS. 3B and 3C may be viewed as representing the historical output and deviation data from a first batch, which may be used in conjunction with convolution windows to generate an increment or update that is added to the previous output signal 116 to provide the control output at time "t" for a subsequent, preferably immediately subsequent, batch.

Figure 3D:
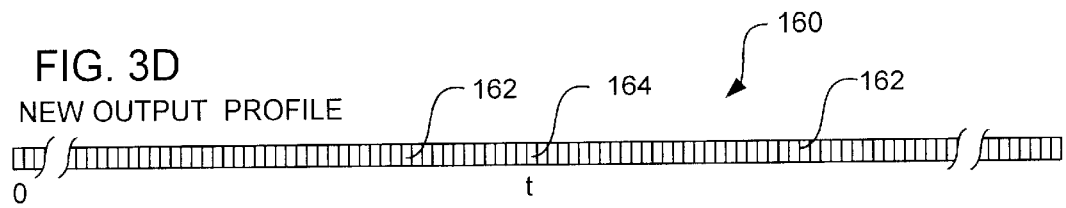
FIG. 3D is a schematic view of a newly generated batch controller output profile storage having numerous time slots populated with outputs to control the heater of FIG. 1.

FIG. 3D illustrates a controller output profile 160 to be used in a batch preferably immediately following the batch illustrated by FIGS. 3B and 3C. The second batch output profile 160 may be seen to include numerous time slots 162 and a current time slot 164 corresponding to current time slot 106 of FIG. 3A, and current time slots 116 and 136 of FIGS. 3B and 3C, respectively. In a preferred embodiment of the invention, the data from time slot 106 of FIG. 3A, together with sliding window 114 data of FIG. 3B and sliding window 134 data of FIG. 3C are used, after appropriate calculations as described herein, to create a second batch output in time slot 164.

It is contemplated that each time slot shown in FIGS. 3A-3D may include multiple data entries. For example, in a batch process that includes multiple heater and sensors, each time slot in the desired temperature profile 100 may store a corresponding desired temperature for each sensor of the system, if desired. Likewise, each time slot in the output history profile 110 may store the output value that was provided to each heater in the system during the previous batch run. Similarly, each time slot in the deviation history profile 130 may store the deviation value at each sensor in the system during the previous batch run. Finally, each time slot in the new output profile 160 may store the new output value for each heater in the system.

In one embodiment of the invention, the values to populate time slot 164 of second batch output profile 160 is generated as needed, at a time in close proximity to the point in time for which the control output is needed. The output values from 164 may be used in one embodiment to directly control heaters, while in another embodiment, the values from time slot 164 are used as supervisory set points that are provided to a PID controller to indirectly control the heaters.

In one embodiment of the invention, second batch output profile 160 is generated completely, from start to finish, upon the completion of a first batch run, which may completely populate output history 110 and deviation history 130. In this method, an output profile for a second batch may be completely generated prior to beginning the second batch. In another embodiment, a second batch output profile may be generated upon completion of data acquisition within the appropriate sliding windows, for example, sliding windows 114 and 134 of FIGS. 3B and 3C, respectively. In this embodiment, as soon as the trailing edge of the sliding windows passes the corresponding time slot such as time slots 116 and 136 of FIGS. 3A and 3B, the values may be calculated to populate time slot 164 of FIG. 3D. The time slots of FIGS. 3A–3D are for purposes of illustration, and may be used in some embodiments of the invention. However, the present invention may be accomplished using curve-fitting, modeling, interpolation, and/or data compression methods well known to those skilled in the art.

Figure 4A:
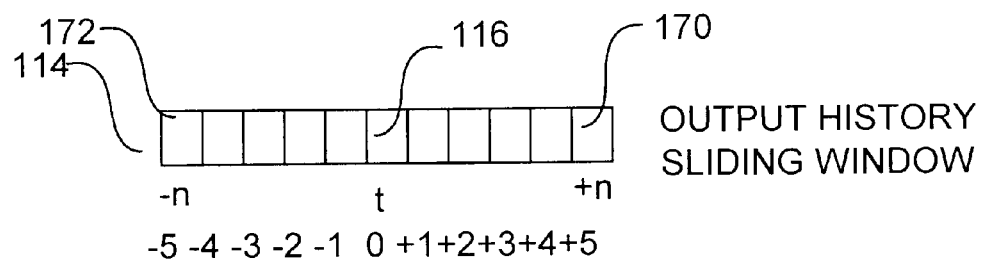
FIG. 4A is a schematic view of the output history sliding time window of FIG. 3B centered about a current time t.

FIG. 4A illustrates sliding window 114 of FIG. 3B, where central time slot 116 may be viewed as having a time equal to "t", having a leading edge time slot 170 at time (t+n), and a trailing edge time slot 172 at time (t−n). Time "t" corresponds to current time 106 of FIG. 3A. In the embodiment illustrated, window 114 has a width of 11, with n equal to 5. It is contemplated that rather than using ±n for the sliding window, the sliding window may be calculated using +n and −m, wherein m≠n.

Figure 4B:
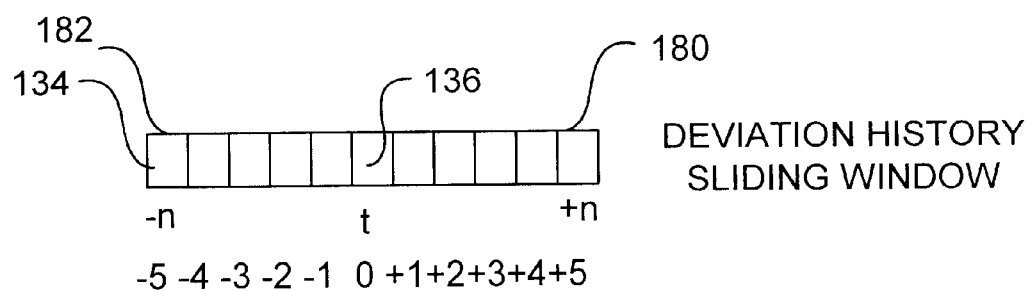
FIG. 4B is a schematic view of the deviation history sliding time window of FIG. 3C, centered about a current time slot t.

FIG. 4B illustrates deviation sliding window 134 of FIG. 3C, having central time slot 136 at time "t", a leading edge at time slot 180 at time (t+n), and a trailing edge time slot 182 at time (t−n). Sliding window 134 of FIG. 4B thus has a width of 11 time slots, with n equal to 5. In one embodiment, the output and deviation windows have the same width. In a preferred embodiment of the invention, only the subset of historical values within sliding windows 114 and 134 are used to influence the control outputs for a subsequent batch, rather than the entire set of values from output history 120 and 130.

Figure 5:
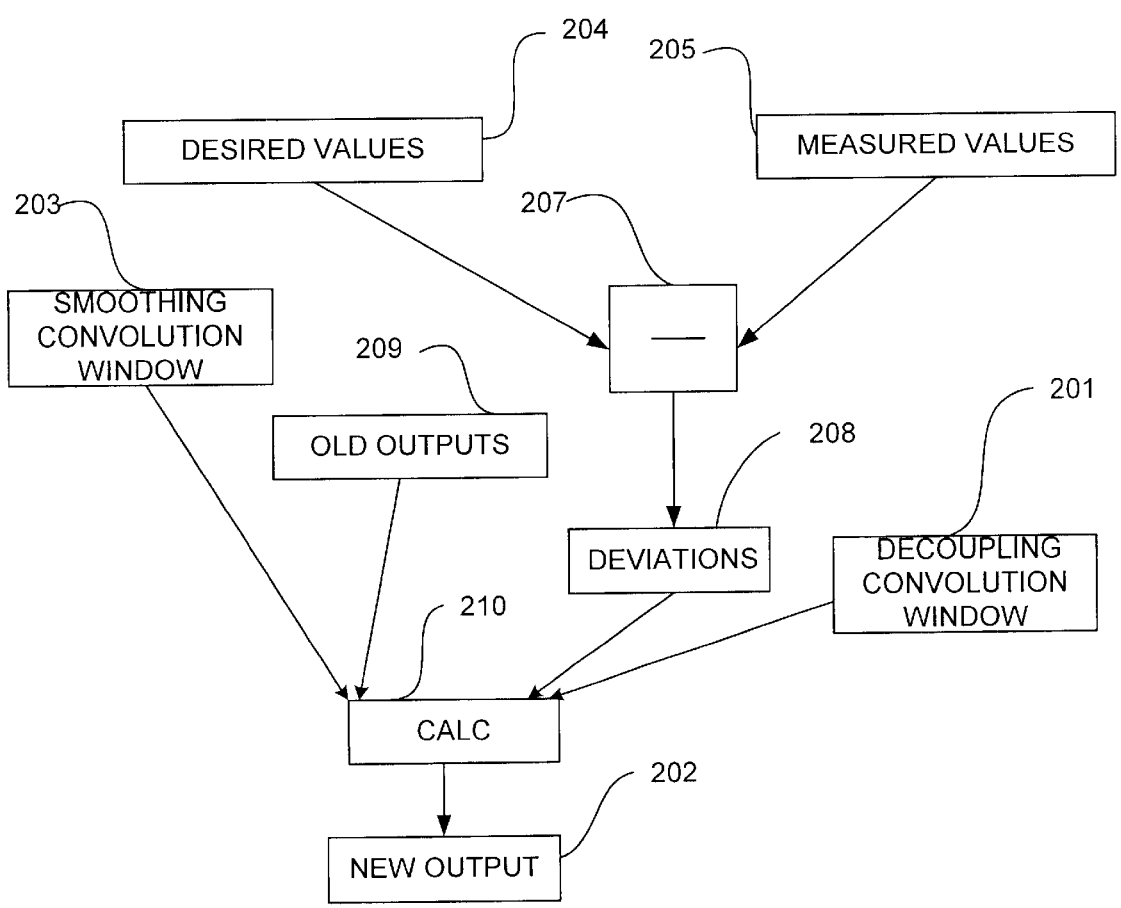
FIG. 5 is a simplified data flow diagram of a method used to generate a single supervisory control output for a subsequent batch using historical deviation values, and historical outputs from the previous batch.

FIG. 5 is a block diagram illustrating data flow used to calculate a new controller output 202 for the current time "t". Deviations 208 are used as inputs and may correspond to sliding window 134 of FIGS. 3C and 4B. Deviations 208 may be provided directly, or may de derived by using desired values 204 and historical measured values 205, compared at 207 to generate deviations or errors at 208. Deviations 208 may be operated upon by a decoupling convolution window 201 to produce an appropriately weighted deviation contribution. A subset of old outputs 209 may be used, and may correspond to the population of sliding window 114 of FIGS. 3B and 4A.

Old outputs 209 may be operated upon by a smoothing convolution window 203 to produce an appropriately weighted output contribution. The convolution operations, and a combining of the output and deviation contributions may be performed as indicated at calculation block 210 to produce an increment or update value. The increment or update value may then be added to the old output at time "t" to provide a new output value 202.

Figure 6:
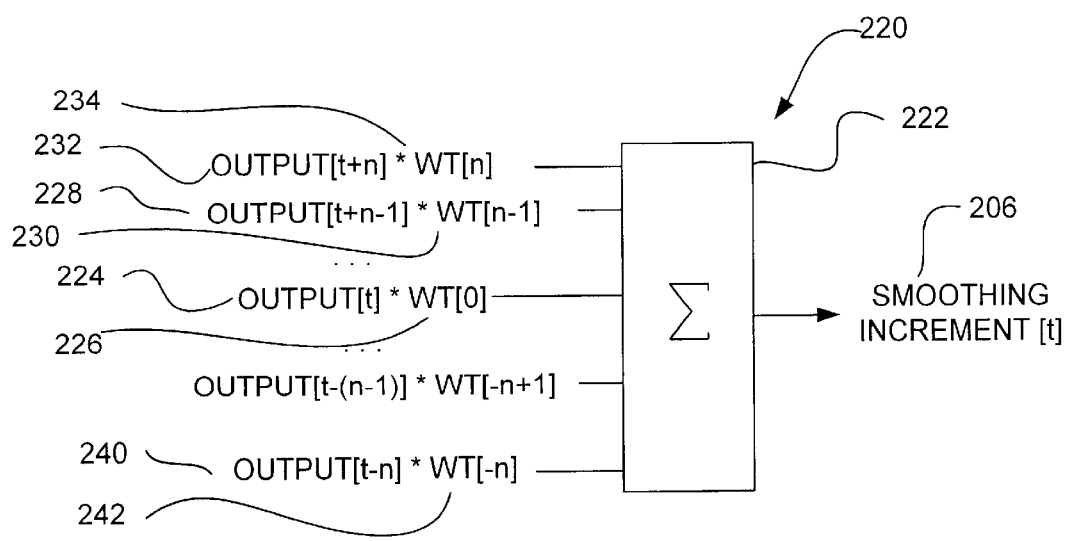
FIG. 6 is a schematic view of data flow for a method operating upon the historical outputs of FIG. 5.

Referring now to FIG. 6, the data flow for a process 220 used to generate the appropriately weighted output is illustrated. The inputs are used as input to a method or algorithm 222 which, in one embodiment, is a simple summation of products. As may be seen from inspection of method 220, numerous outputs are multiplied by numerous factors which are summed to form smoothing increment or update 206. In the example illustrated, an output at time [t+n], the leading edge output 232, is multiplied by a weighting factor [n] 234. Output at time [t+n] 232, may correspond to leading edge time slot 170 of FIG. 4A. The weighting factors may come from an array of constants, which can be a convolution window. An immediately preceding time slot makes a contribution with an output at time [t+n−1] 228 multiplied by a weighting factor [n−1] 230. A central output at time [t] 224 is multiplied by a weighting factor [0] 226. Similarly, an output at the trailing edge of the sliding window, or output at time [t−n] 240, is multiplied by a weighting factor [−n] 242. Output at time [t−n] 240 may correspond to trailing edge time slot 172 of FIG. 4A in some embodiments.

As subsequently discussed, the weighting factors may be appropriately tailored for each batch process, and preferably not identical for each time slot within a sliding window. In one embodiment, outputs including 232, 228, 224, and 240 of FIG. 6 correspond to the subset of historical output values populating sliding window 114 of FIG. 3B. The weighting factors 234, 230, 226, and 242 may correspond to the values populating smoothing convolution window 320 as discussed below with respect to FIG. 9.

Figure 7:
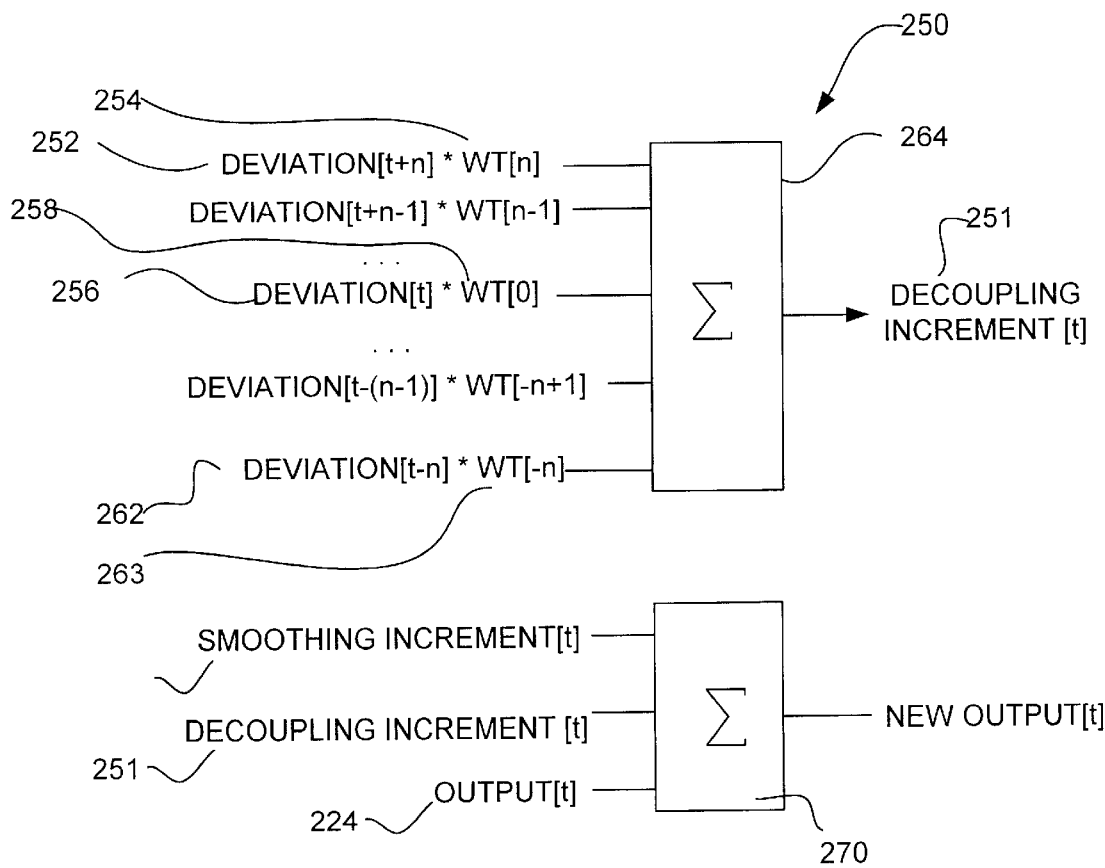
FIG. 7 is a schematic view of data flow for a method operating upon the historical deviations of FIG. 5.

FIG. 7 illustrates a similar treatment for a process or method 250 used to calculate an appropriately weighted decoupling increment 251. In particular, a deviation at time [t+n] 252 is multiplied by a deviation weighting factor [n] 254. A deviation at time [t] 256 is multiplied by a deviation weighting factor [0] 258. A deviation at time [t−n] 262 is multiplied by a deviation weighting factor [−n] 263. A method 264 may be seen to operate on the provided inputs and, in a preferred embodiment, is a simple summation of the weighted values.

Methods 222 of FIG. 6 and 264 of FIG. 7 may be included in the calculation block 210 of FIG. 5. In one embodiment, deviations including 252, 256, and 262 of FIG. 7 correspond to the subset of historical deviation values populating sliding window 134 of FIG. 3C. The weighting factors 254, 258, and 263 may correspond to the values populating decoupling convolution window 300 discussed below with respect to FIG. 8. The appropriate weights used to populate the smoothing convolution window and decoupling convolution window may be appropriately determined for each batch process.

A new output value at time [t] is calculated by simply adding the smoothing increment or update 206, the decoupling increment or update 251, and the previous output at time [t] 224, as shown at 270. This provides a computationally simple method for providing an iterative update from batch to batch to achieve tighter batch-to-batch control.

Figure 8:
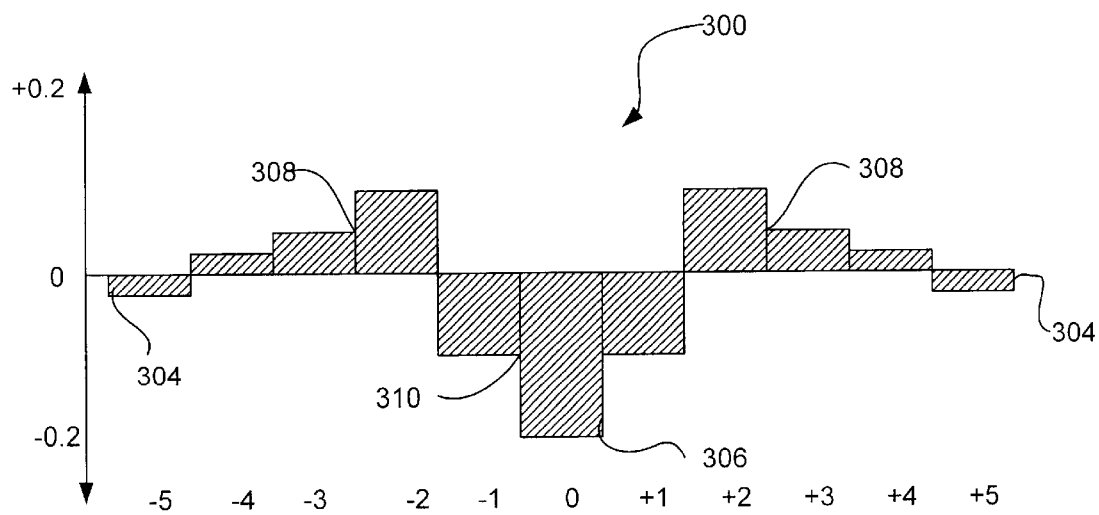
FIG. 8 is a highly diagrammatic view of a decoupling convolution window having weighting factors to operate upon the deviation terms in FIG. 6.

FIG. 8 illustrates the distribution of deviation weighting factors as used in one embodiment of the invention. A deviation or decoupling convolution window 300 is illustrated. Deviation window 300 is illustrated as a plot of weighting factor magnitude versus time slot number. Deviation weighting factor window 300 includes a central slot [0] 306, a leading edge slot [5] 304, and a trailing edge slot [−5] 304. As may be seen from inspection of FIG. 8, deviation weighting factor window 300 has a central, negative weighting portion 310, as well as positive weighting portions 308. FIG. 8 may be seen to have a width of 11 time slots.

The width of the decoupling convolution window is preferably experimentally determined for each individual batch process. The values of the weighting fractions illustrated in FIG. 8 are likewise preferably experimentally determined for each individual batch process. In a preferred embodiment, deviation weighting factor window 300 is established for a batch and is the same for each temporal region of the batch. In particular, while the deviation, output, and desired temperature values will change within each sliding window as the window slides over the length of the batch period, the deviation weighting factor window values preferably remain constant over the entire batch. In one embodiment, the values within the deviation weighting factor window are initially determined with process upsets and are subsequently either left unchanged or modified slightly with process dynamic information gleaned from ongoing measurements of the process.

Figure 9:
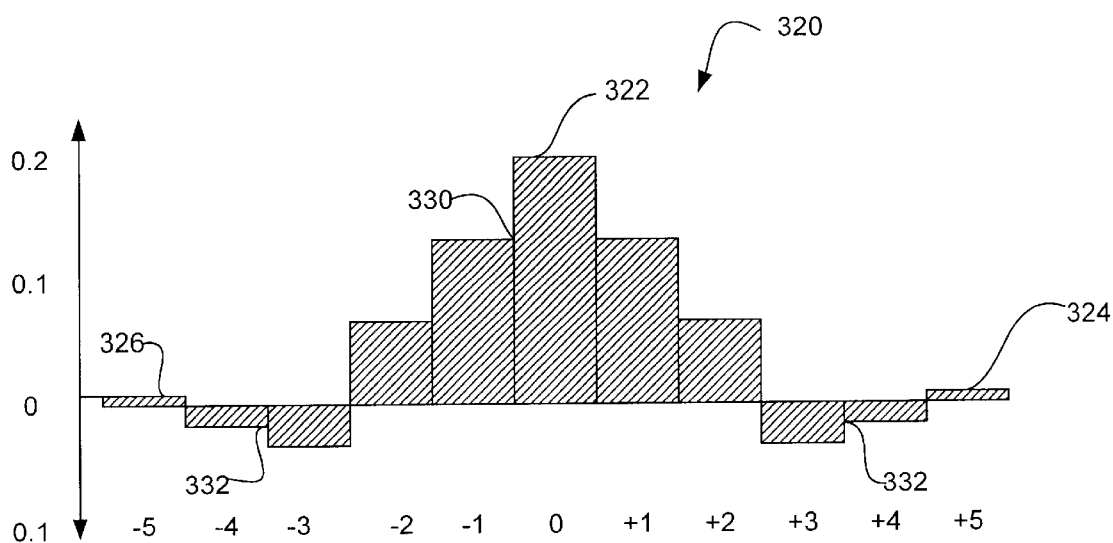
FIG. 9 is a schematic view of a smoothing convolution window having weighting factors to operate upon the deviation terms of FIG. 7.

FIG. 9 illustrates an output weighting factor window or smoothing convolution window 320, illustrated as a plot of weighting factor versus time slot number. Output weighting factor window 320 includes a central slot [0] 322, a leading edge slot [5] 324, and a trailing edge slot [−5] 326. A central positive weighted region 330 may be observed, as well as negative weighting regions 332. In a preferred embodiment, the width and values for output weighting factor window 320 are experimentally determined and remain the same over the length of a given batch run. The width and values may be determined by providing step changes, pulse changes, or minor excitations superimposed on an otherwise normal output, with the process response analyzed to generate the smoothing convolution window population.

The present invention may be further explained with reference to one example. In this example, the current batch run measured temperature is stored in measured temperature history storage, and the output to control the batch run is stored in output history storage. To generate the output profile for the next batch run, the desired temperature profile is used to generate a deviation or error history, by comparing the desired temperature profile with the measured temperature. Each output time slot for the next batch run may be generated as described below in steps (a) through (c).

(a) For each time slot within the width of the smoothing convolution window and historical output sliding window, multiply the output weighting factor that corresponds to that time slot by the output for that time slot, and add together the sum of the products for all time slots within the smoothing convolution window to obtain a smoothing increment or update 206 for that time slot in the next batch run;

(b) For each time slot within the width of the decoupling convolution window and historical deviation sliding window, multiply the deviation weighting factor that corresponds to that time slot by the deviation for that time slot, and add together the sum of the products for all time slots within the deviation convolution window to obtain a decoupling increment or update 251 for that time slot in the next batch run;

(c) For the same time slot as in steps (a) and (b), add together the smoothing increment or update 206 and the decoupling increment or update 251, and add the result to the output value at the current time slot from the previous batch to obtain an output to be used for the time slot in the next batch run.

In a variation of this example, the current batch run measured temperature is immediately compared to the current time slot desired temperature, and a current deviation temperature calculated. The current deviation temperature may be stored in a deviation temperature history, rather than storing the measured temperature history. Thus, the desired temperature profile may enter into the calculations at the time of deviation or error calculation, which may be either before or after the historical storage is performed.

Figure 10:
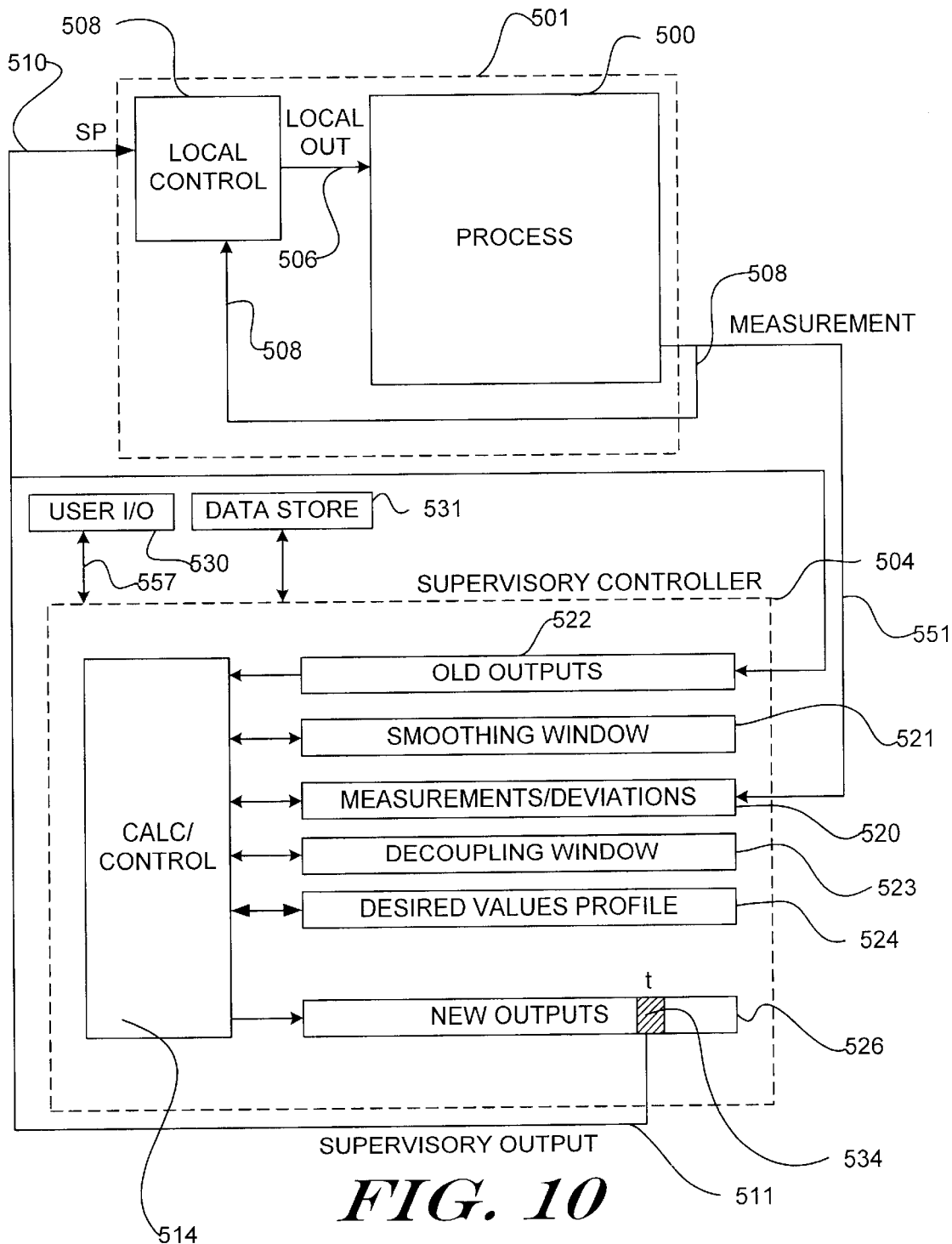
FIG. 10 is a schematic view of a supervisory control apparatus used to control the process of FIG. 1 using the methods of FIGS. 2–9, and 11–12.

Referring now to FIG. 10, a schematic view of a plant 501 and a computer or controller 504 is illustrated. Plant 501 includes a batch process 500 and may be seen to receive a local control output 506 generated by a local controller 508 in response to a set point received through a set point communication line 510. Set point communication line 510 may be seen to be coupled to the output communication line or supervisory output line 511 of the present invention. A measured value 508 may be seen to be read from process 500 and, in one embodiment, is used by local controller 508 as a feedback signal. In the embodiment illustrated, measured value 508 also is read by controller or computer 504 through a measurement data communication line 551.

Computer 504 may be any appropriate general-purpose computer or dedicated computing device capable of carrying out the required computations, inputs, outputs, and execution of programs embodying the methods described herein. In one embodiment, a general-purpose computer is used. In another embodiment, a dedicated onboard or embedded microprocessor device is used as computer 504. Computer 504 may include a calculating and controlling portion 514 which can communicate with a measured value/deviation value portion 520, an output storage region 522, a desired value profile region 524, and a generated new output profile portion 526. Computer 504 may also include a user I/O portion 530 and a data storage portion 531. As previously discussed, in one embodiment of the invention, deviations or errors may be historically recorded directly, or recorded indirectly as the measured values, and the deviations later calculated by comparison with the desired values. In the embodiment illustrated, computer 504 has a smoothing convolution window portion 521 and a decoupling convolution window portion 523.

In one example of the present invention, a desired values profile is input from control portion 514 in response to entered human or machine input at 530. In one embodiment, desired values profile 524 includes temperatures, including the desired temperature ramp-up and ramp-down portions for a thermal process. In a preferred embodiment, desired values profile 524 remains unchanged for each run of a batch process. In one example of the present invention, measured value 508 enters computer 504 through communication line 551 and is compared with the current desired value, and is stored by computer 504 as a deviation or error for the currently active run in deviation/measured value historical portion 520. Similarly, the current output generated by computer 504, namely, output 534, is fed into historical output region 522 for the currently executing batch run.

After completion of the current run, or at the completion of a sufficient portion of the present run, calculating portion 514 may operate upon deviation/measured historical data 520 using decoupling convolution window 523, and upon output historical data 522 using smoothing convolution window 521, to populate a new output storage portion 526 for each of the appropriate time slots. Upon completion of population of new output storage region 526, the output storage region may be used to generate a set point through communication line 510 to plant 501. In the example illustrated, a time slot 534 is illustrated as providing output to communication line 511 and driving a set point through communication line 510. While the output value in time slot 534 is driving the set point, new deviation and output historical values are being recorded to generate the subsequent batch run outputs.

As may be seen from inspection of FIG. 10, while batch heating control would benefit from the present invention, there is nothing restricting use of the present invention to any particular batch process. In particular, from inspection of FIG. 10, it may be seen that computer 504 may be oblivious to the physical nature of the process being controlled, and may be operating on scaled units, not having access to engineering units. In particular, the set point value in communication line 510, the output value in output line 511, and the measurement value in measurement line 551 may have any engineering units, or no engineering units, for any measured physical value. In one example, the set point, output, and measurement may be scaled values, for example, 4–20 milligrams or arbitrary percent of full scale values.

Figure 11:
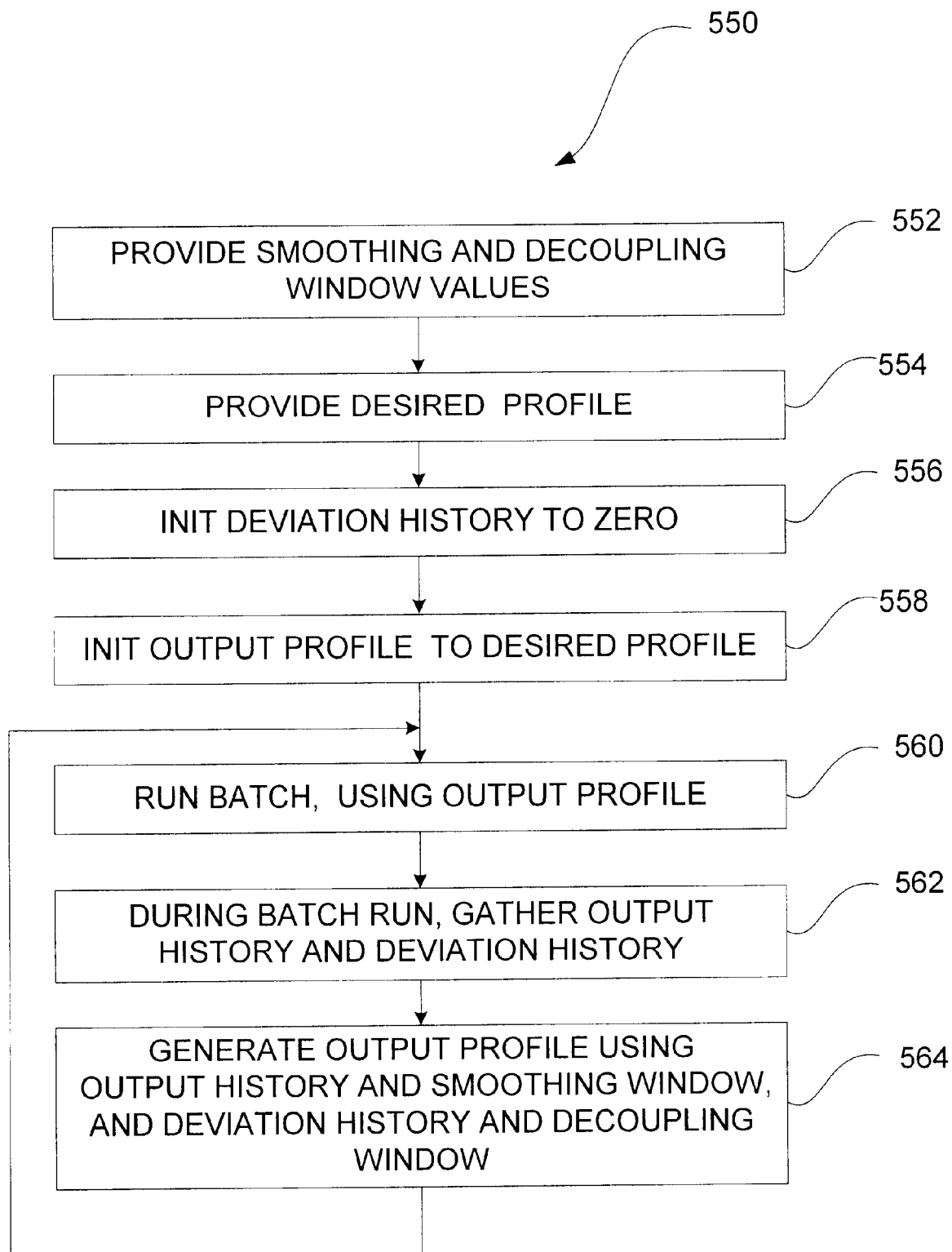
FIG. 11 is a flow chart of a method for controlling a batch process.

FIG. 11 illustrates a flow chart for a method 550 which can be used to control a batch process. In step 552, the smoothing and decoupling convolution windows are provided, for example, either from experiment or from process modeling. The desired process value profile or recipe is provided in step 554. The deviation history can be initialized to zero in step 556, and the previous output history initialized to be equal to the desired value profile.

The first batch may be executed at step 560, using the output profile previously initialized to be the desired value profile. In the first batch, there is no influence from any previous output or deviation history. The output history and deviation history of the current batch may be recorded in step 562. After the batch run is complete, or after a sufficient portion of the first batch run is complete, a new output profile may be generated using the convolution windows, deviation history, and output history, in step 564. A new batch may be executed in step 560 using the new outputs.

Figure 12:
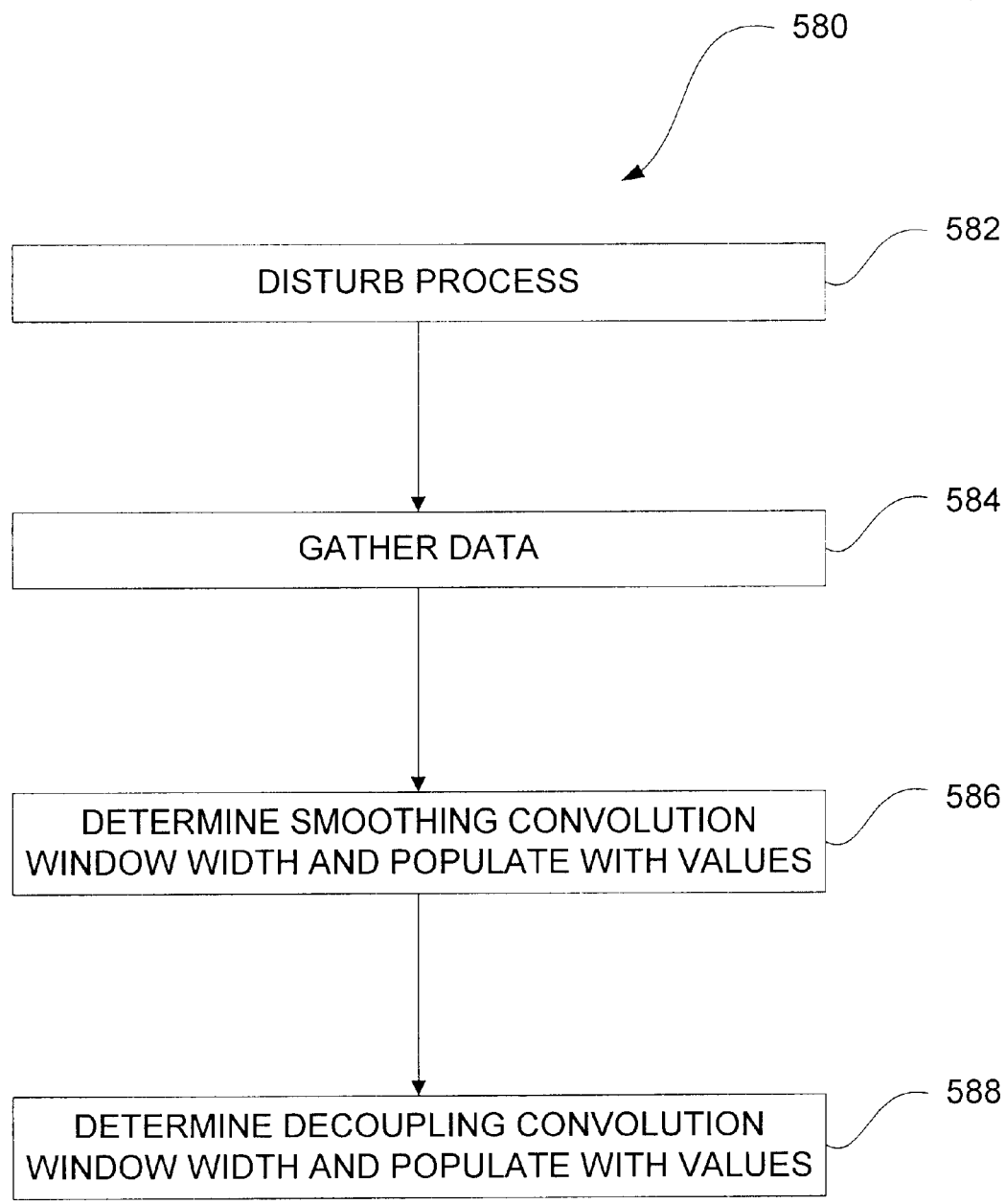
FIG. 12 is a flow chart of a method for generating smoothing and decoupling convolution window values and widths.

FIG. 12 illustrates a high level flow chart of a method 580 for obtaining values to populate the smoothing and decoupling convolution windows. In step 582, a pulse or step output may be provided to the process, with the process response data gathered in step 584. The width and proper values for the smoothing convolution window may be determined in step 586. The width and proper values for the decoupling convolution window may be determined in step 588.

As discussed above, the width of the sliding windows and the shape of the deviation or decoupling convolution window weighting factors and output or smoothing convolution window weighting factors may be experimentally determined for a given batch process. The process characteristics needed to populate the deviation weighting factor window and the output weighting factor window may be experimentally determined. The tuning computations to populate the windows and determine the window width may use an averaged (Finite Impulse Response) FIR model of the process pulse or step response, as well as the uncertainty model for this response.

Computing the iterative update control window sequences can be done in accordance with one of the published techniques, for example, as discussed by D Gorinevsky, in "Distributed System Loop Shaping Design of Iterative Control or Batch Processes," Proc. of IEEE Conference on Decision and Control, pp. 203–208, Phoenix, Ariz. December 1999, which is incorporated herein by reference. The model for an averaged pulse process pulse response can be obtained from an available first principle process model or as a result of a experimentally identification of a process. The uncertainty model required can describe variation of the process pulse response shape over the batch run because of the underlying process nonlinearity. The uncertainty model can be automatically determined together with the process response model. Alternatively, a user can provide the model uncertainty level as a tuning parameter. This tuning parameter conveniently defines the basic tradeoff between control or performance and robustness or control energy in residual error in the abdicated iterative update control update approach.

In most cases, an experimental identification in process is used. A model of the averaged pulse or set response of the process can be obtained by forming a batch run where a special excitation sequence is added to the set point or desired temperature profile. By collecting the data during the identification experiment, and comparing it to baseline data collected without excitation sequence, and performing signal processing such as least-squared fit, the set response can be identified from the data.

An FIR model of step or pulse response can be identified from the collected data using a least-squared fit technique and algorithms well known to those skilled in the art. In one embodiment, an initial batch is run and step or pulse testing is performed to obtain the necessary process dynamics. The gathered data can be used to generate the suggested sliding window length and shape of the decoupling convolution window (deviation weighting factor window) and the smoothing convolution window (output weighting factor window), as discussed in the Gorinevsky paper, previously incorporated by reference.

As discussed with respect to FIG. 1B, the present invention may be used with Multiple Input Multiple Output (MIMO) processes, as well as with Single Input Single Output (SISO) processes. One advantageous use of the present invention in for rapid thermal processing of material, for example, semiconductor material in heated chambers. The chambers may have multiple heating lamps and temperature sensors. The temperature sensors and heaters may be grouped into channels, where the sensor outputs may be averaged, and the heaters controlled together in groups.

The present invention may now be discussed mathematically with respect to single and multiple channels. Let "k" represents the batch run number of the previous batch run, and let "k+1" be the batch number of the current batch run. With reference to FIG. 1A, an output 40 may be termed u, and may be further discussed as u(t |) k+1) for the output at a given time slot "t" in the current batch "k+1". u(t|k) is the output from the previous batch run at the time slot "t". Let M be the width of the convolution windows, with the variable "j" used to iterate through the time slots of the convolution windows. Variables "+n" and "−m" represent the portion of the convolution window that extends in the positive and negative direction in time from the current time "t", respectively. Lower case e(t−j|k) represents the deviation or error term corresponding to the "jth" time slot relative to the current time "t" in the previous batch run "k". D(j) represents the decoupling convolution window, or window containing the weighting factors for the deviation or error terms. S(j) is the smoothing convolution window or output weighting factor window. The equations below may be viewed also as using vector or array notation to index into the named variables as vectors or arrays. The output u(t|k+1), at a given time slot "t" may be expresses as follows:

$$u(t|k+1) = u(t|k) + \sum_{j=-m}^{n} D(j)e(t-j|k) + S(j)u(t-j|k) \quad (1)$$

Note that "j" may iterate through windows e(t−j) and u(t−j) where the windows have offsets to indicate the corresponding locations within the corresponding historical storage areas.

Where there are multiple zones or channels are used, each represented by "y", the output $u_y(t|k+1)$ at a given time slot "t" may be expresses as follows:

$$u_y(t|k+1) = u_y(t|k) + \sum_{j=-m}^{n} D_y(j)e_y(t-j|k) + S_y(j)u_y(t-j|k) \quad (2)$$

Having thus described the preferred embodiments of the present invention, those of skill in the art will readily appreciate that the teachings found herein may be applied to yet other embodiments within the scope of the claims hereto attached.

What is claimed is:

1. A method for generating an output at a selected time of a current batch run to control a batch run variable, the batch run extending over a time period and having a desired process value profile, the method comprising:

obtaining a deviation history value set for a preceding batch run, the deviation history value set representing a deviation between the batch run variable and the desired process value profile at selected time intervals during the preceding batch run;

obtaining an output history value set for the preceding batch run, the output history value set representing the outputs that were provided at selected time intervals during the preceding batch run;

generating a smoothing update as a function of a subset of said preceding output history value set near said selected time in said preceding batch run and as a function of a smoothing convolution window;

generating a decoupling update as a function of a subset of said preceding deviation history value set near said selected time in said preceding batch run and as a function of a decoupling convolution window; and generating said output as a function of said smoothing update and said decoupling update.

2. A method for generating an output as in claim 1, wherein said output history subset has a number of time slots, and wherein said smoothing convolution window includes output weighting factors for each of said time slots, said smoothing update calculated by multiplying said output subset values by said corresponding output weighting factors.

3. A method for generating an output as in claim 1, wherein said deviation subset has a number of time slots, and wherein said decoupling convolution window includes deviation weighting factors for each of said time slots, said decoupling update calculated by multiplying said deviation subset values by said corresponding deviation weighting factors.

4. A method for generating an output as in claim 1, wherein:

said output history subset has a number of time slots, and wherein said smoothing convolution window includes output weighting factors for each of said time slots, said smoothing update calculated by multiplying said output subset values by said corresponding output weighting factors; and said deviation subset has a number of time slots, and wherein said decoupling convolution window includes deviation weighting factors for each of said time slots, said decoupling update calculated by multiplying said deviation subset values by said corresponding deviation weighting factors.

5. A method for generating an output as in claim 1, wherein said output is generated by adding said smoothing update and said decoupling update to the output value of the selected time in said preceding batch run.

6. A controller for controlling a batch process, said batch process having a time period, said batch process having a control input and a measured value output, said controller comprising:
- a controller input coupled to said batch process measured value output and a controller output coupled to said batch process control input;
- a desired measured value profile over said batch time period; and
- an executing program, said program executing a method comprising the steps of
  - storing said controller outputs over at least a portion of a previous batch time period in a previous batch output history,
  - calculating a deviation between said desired measured value profile and said measured value over said previous batch time period and storing said deviation in a previous batch deviation history,
  - providing a smoothing convolution window,
  - providing a decoupling convolution window, and
  - generating said controller outputs over a current batch time period as a function of said previous batch output history, said smoothing convolution window, said previous batch deviation history, and said decoupling convolution window.

7. A computer program for generating a control output to control a batch process having a batch time period at a selected time into said batch time period, said batch process having a control input and a measured value output, said program comprising the steps of:
- storing a plurality of said control outputs over at least a portion of a previous batch time period as a previous batch output history;
- obtaining a plurality of desired measurement value outputs;
- reading in a plurality of said batch process measured value outputs obtained over at least a portion of the previous batch time period;
- calculating a plurality of deviations between said desired measured value outputs and said batch process measured value outputs over said previous batch period and storing said deviation as a previous batch deviation history,
- providing a smoothing convolution window,
- providing a decoupling convolution window, and
- generating said control output for said current batch period as a function of said previous batch output history, said smoothing convolution window, said previous batch deviation history, and said decoupling convolution window.

8. A computer program product for a generating control output to control a batch process having a time period at a selected time into said batch time period, said batch process having a control input coupled to said control output and a measured value output, said computer program product comprising:
- a computer readable medium having computer readable program code embodied in said medium for causing a batch control method to be executed, the method comprising the steps of
  - providing desired measured value outputs for said batch time period as a desired measured value profile;
  - storing a plurality of said control outputs over at least a portion of a previous batch time period as a previous batch output history;
  - reading in a plurality of said batch process measured value outputs obtained over at least a portion of the previous batch time period;
  - calculating a plurality of deviations between said desired measured value profile and said batch process measured value outputs over said previous batch period and storing said deviation as a previous batch deviation history,
  - providing a smoothing convolution window,
  - providing a decoupling convolution window, and
  - generating said control output for said current batch period as a function of said previous batch output history, said smoothing convolution window, said previous batch deviation history, and said decoupling convolution window.

9. A controller for controlling a batch process, said batch process having a time period, said batch process having a control input and a measured value output, said controller comprising:
- a local controller for controlling the control input based on the measured value output, the local controller having a supervisory controller input;
- a supervisory controller coupled to the supervisory controller input of the local controller and the measured value output, the supervisory controller:
  - storing a desired measured value profile over said batch time period;
  - storing said supervisory controller outputs over at least a portion of a previous batch time period into a previous batch output history;
  - calculating a deviation between said desired measured value profile and said measured value over said previous batch time period and storing said deviations into a previous batch deviation history,
  - storing a smoothing convolution window,
  - storing a decoupling convolution window, and
  - generating said supervisory controller outputs over a current batch period as a function of said previous batch output history, said smoothing convolution window, said previous batch deviation history, and said decoupling convolution window.

* * * * *